United States Patent
Tabasso et al.

(10) Patent No.: US 11,533,953 B2
(45) Date of Patent: Dec. 27, 2022

(54) BATTERY POWERED AEROSOL-GENERATING DEVICE COMPRISING A TEMPERATURE DEPENDENT BATTERY PRE-HEATING

(71) Applicant: Philip Morris Products S.A., Neuchatel (CH)

(72) Inventors: Alain Tabasso, Essertines-sur-Yverdon (CH); Fabien Duc, Carouge (CH); Jacques Robert, Le Mont-sur-Lausanne (CH); Michel Bessant, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 940 days.

(21) Appl. No.: 16/310,224

(22) PCT Filed: Jun. 15, 2017

(86) PCT No.: PCT/EP2017/064663
§ 371 (c)(1),
(2) Date: Dec. 14, 2018

(87) PCT Pub. No.: WO2018/001746
PCT Pub. Date: Jan. 4, 2018

(65) Prior Publication Data
US 2019/0320717 A1    Oct. 24, 2019

(30) Foreign Application Priority Data
Jun. 29, 2016    (EP) .................................... 16176953

(51) Int. Cl.
*A24F 40/51*    (2020.01)
*H01M 10/615*    (2014.01)
(Continued)

(52) U.S. Cl.
CPC .............. *A24F 40/51* (2020.01); *A24F 40/00* (2020.01); *A24F 40/50* (2020.01); *A24F 40/57* (2020.01);
(Continued)

(58) Field of Classification Search
CPC .......... A24F 40/51; A24F 40/00; A24F 40/50; A24F 40/57; A24F 40/90; A24F 40/20;
(Continued)

(56) References Cited

U.S. PATENT DOCUMENTS

| 6,440,602 B1 | 8/2002 | Morita |
| 11,241,548 B2 * | 2/2022 | Qiu ........................ A24F 40/51 |

(Continued)

FOREIGN PATENT DOCUMENTS

| CN | 201041817 Y | 3/2008 |
| CN | 101416330 A | 4/2009 |

(Continued)

OTHER PUBLICATIONS

Office Action dated Jul. 1, 2021 in corresponding Japanese Patent Application No. 2018-565051 (with English Translation), citing documents AA, AO-AR therein, 5 pages.

(Continued)

*Primary Examiner* — Abdullah A Riyami
*Assistant Examiner* — Justin M Kratt
(74) *Attorney, Agent, or Firm* — Oblon, McClelland, Maier & Neustadt, L.L.P.

(57) ABSTRACT

An aerosol-generating system provided, including an electrically operated aerosol-generating element; a first electrochemical energy storage device (EESD) configured to supply electrical power to the aerosol-generating element; and an EESD temperature control system including at least one temperature sensor positioned to sense a temperature of the first EESD and an electrical heater configured to heat the (Continued)

first EESD, wherein the EESD temperature control system operates the electrical heater dependent on an output from the at least one temperature sensor.

16 Claims, 7 Drawing Sheets

(51) Int. Cl.

| | |
|---|---|
| *H01M 10/623* | (2014.01) |
| *H01M 10/633* | (2014.01) |
| *H01M 10/6571* | (2014.01) |
| *H01M 10/48* | (2006.01) |
| *H02J 7/00* | (2006.01) |
| *H05B 1/02* | (2006.01) |
| *A24F 40/00* | (2020.01) |
| *A24F 40/50* | (2020.01) |
| *A24F 40/57* | (2020.01) |
| *A24F 40/90* | (2020.01) |
| *H01M 10/657* | (2014.01) |
| *A24F 40/20* | (2020.01) |
| *A24F 40/465* | (2020.01) |
| *A24F 40/95* | (2020.01) |
| *H01M 8/04007* | (2016.01) |
| *H01M 8/04223* | (2016.01) |
| *H01M 8/0267* | (2016.01) |

(52) U.S. Cl.
CPC ........... *A24F 40/90* (2020.01); *H01M 10/486* (2013.01); *H01M 10/615* (2015.04); *H01M 10/623* (2015.04); *H01M 10/633* (2015.04); *H01M 10/657* (2015.04); *H01M 10/6571* (2015.04); *H02J 7/0042* (2013.01); *H05B 1/0297* (2013.01); *A24F 40/20* (2020.01); *A24F 40/465* (2020.01); *A24F 40/95* (2020.01); *H01M 8/0267* (2013.01); *H01M 8/04037* (2013.01); *H01M 8/04067* (2013.01); *H01M 8/04253* (2013.01); *H01M 2220/30* (2013.01); *Y02E 60/10* (2013.01)

(58) Field of Classification Search
CPC .... A24F 40/465; A24F 40/95; H01M 10/486; H01M 10/615; H01M 10/623; H01M 10/633; H01M 10/657; H01M 10/6571; H01M 2220/30; H01M 8/0267; H01M 8/04067; H01M 8/04037; H01M 8/04253; H02J 7/0042; H05B 1/0297; Y02E 60/10
USPC .................................................. 429/433, 434
See application file for complete search history.

(56) References Cited

U.S. PATENT DOCUMENTS

| | | |
|---|---|---|
| 2011/0198335 A1 | 8/2011 | Lin |
| 2012/0227753 A1 | 9/2012 | Newton |
| 2013/0319440 A1 | 12/2013 | Capuano |
| 2014/0305449 A1 | 10/2014 | Plojoux et al. |
| 2014/0333267 A1 | 11/2014 | Crawley |
| 2014/0345635 A1 | 11/2014 | Rabinowitz et al. |
| 2015/0008887 A1 | 1/2015 | Kim et al. |
| 2015/0245668 A1* | 9/2015 | Memari ............. A24F 40/60 206/250 |
| 2016/0359207 A1* | 12/2016 | Cornelius ............ H01M 10/63 |
| 2017/0033568 A1 | 2/2017 | Holzherr |
| 2017/0207499 A1 | 7/2017 | Leadley |

FOREIGN PATENT DOCUMENTS

| | | |
|---|---|---|
| CN | 201266841 Y | 7/2009 |
| CN | 201294250 Y | 8/2009 |
| CN | 201616494 U | 10/2010 |
| CN | 201655931 U | 11/2010 |
| CN | 102859784 A | 1/2013 |
| CN | 203632311 U | 6/2014 |
| CN | 104242390 A | 12/2014 |
| CN | 205211892 U | 5/2016 |
| CN | 106575877 A | 4/2017 |
| EP | 2 110 033 A1 | 10/2009 |
| GB | 2528711 A | 2/2016 |
| JP | 8-308129 A | 11/1996 |
| JP | H09147813 A * | 6/1997 |
| JP | 2006-196256 A | 7/2006 |
| JP | 2008-269855 A | 11/2008 |
| JP | 3159913 U | 6/2010 |
| RU | 2 400 110 C1 | 9/2010 |
| WO | WO 2013/098395 A1 | 7/2013 |
| WO | WO 2014/190079 A2 | 11/2014 |
| WO | WO 2015/165813 A1 | 11/2015 |
| WO | WO 2016/016620 A1 | 2/2016 |

OTHER PUBLICATIONS

Notice of Allowance dated Sep. 24, 2020 in Russian Patent Application No. 2019102193 (with English transiation), citing document AO therein, 17 pages.
Russian Search Report dated Sep. 24, 2020 in Russian Patent Application No. 2019102193 (with English translation), citing document AO therein, 4 pages.
Combined Chinese Office Action and Search Report dated Apr. 6, 2021 in corresponding Chinese Patent Application No. 201780035069.X (with English Translation) citing documents AA, AO-AV and AX therein, 28 pages.
Zhu Xiaoqing, "Handbook of Lighting Technology", China Machine Press, Publishing date Nov. 30, 1995 (related p. 161), 3 pages.
Combined Chinese Office Action and Search Report dated Apr. 19, 2022 in Chinese Patent Application No. 201780035069.X (with English translation), citing references AO-AQ and AX therein, 26 pages.
Integration and Construction of Solar Photovoltaic Power Generation System, edited by Yan Luxin, Northwestern Polytechnical University Press, 2015, pp. 120-121 (4 pages).
Korean Office Action dated Jul. 15, 2022 in corresponding Korean Patent Application No. 2018-7033573 (with English translation), 21 pages.
Third Office Action dated Sep. 15, 2022, issued in corresponding Chinese patent application No. 201780035069 (with English translation).
International Preliminary Report on Patentability and Written Opinion dated Jan. 10, 2019 in PCT/EP2017/064663.
"Self-Heating Batteries" Creax, Penn State University, General Introduction, May 2, 2016, 1 Page.
International Search Report and Written Opinion dated Sep. 25, 2017 in PCT/EP2017/064663 filed Jun. 15, 2017.

* cited by examiner

BATTERY POWERED AEROSOL-GENERATING DEVICE COMPRISING A TEMPERATURE DEPENDENT BATTERY PRE-HEATING

The invention relates to battery powered aerosol generating systems and in particular handheld battery powered aerosol-generating systems that may be required to operate in a variety of different environments.

Batteries for handheld aerosol-generating devices, such as electrically heated smoking devices or e-cigarettes, are required to be small but at the same time must be able to deliver significant amounts of power over a period of just a few minutes, typically around 7 minutes for a single smoking session. It is also desirable that the batteries are rechargeable and that they can be recharged sufficiently to allow for another complete smoking experience in a matter of a few minutes and preferably less than 6 minutes.

Because the batteries for handheld aerosol-generating devices are small in order to keep the overall size of the device small, they typically need to be recharged frequently. In the case of an electrically heated smoking system, the battery may have a capacity sufficient for only a single smoking session and so need recharging after each smoking session. For this reason, portable chargers are provided with some devices. The portable chargers are themselves battery powered. The battery used in a portable charger also needs to have a relatively small size and high capacity.

Lithium ion batteries can meet the requirements for both aerosol-generating devices and for portable chargers. But the performance of lithium ion batteries is significantly affected by temperature. Different batteries perform differently, but in general, at temperatures below 10 degrees Celsius, the performance of batteries, such as lithium ion batteries, as well as lithium capacitors, is significantly reduced. In particular, the available discharge capacity falls sharply below this temperature. This is a significant problem because aerosol-generating devices are routinely required to operate in cold climates or cold environments. Furthermore, aerosol-generating devices may be required to operate consistently at one moment in a cold environment, such as outdoors at a ski resort, and the next moment in a warm indoor environment. There may be a difference of as much as 40 degrees Celsius in the ambient temperature between one use and the next. In fact, from a manufacturing standpoint, aerosol-generating devices and portable chargers need to operate consistently over a range of as much as 60 degrees Celsius.

It would be desirable to provide an aerosol-generating device, system and method that provides for an acceptable level of performance even at very low ambient temperatures, without compromising the size or ease of use of the device and system.

In a first aspect, there is provided an aerosol-generating system comprising:
an electrically operated aerosol-generating element;
a first electrochemical energy storage device (EESD) configured to supply electrical power to the aerosol-generating element; and
an EESD temperature control system comprising at least one temperature sensor positioned to sense a temperature of the first EESD and an electrical heater configured to heat the first EESD, wherein the EESD temperature control system operates the electrical heater dependent on an output from the at least one temperature sensor.

The system may comprise a handheld aerosol-generating device and the aerosol-generating device may comprise the aerosol-generating element, the first EESD and the EESD temperature control system.

The first EESD may be a battery or it may be a supercapacitor or a lithium capacitor (LIC). The first EESD may comprise a lithium ion battery. In one embodiment the first EESD comprises a lithium iron phosphate battery, but other battery types may be used.

The first EESD is advantageously sized to fit in a handheld device and advantageously has a volume of no more than 100 cm$^3$. In one embodiment, the first EESD is cylindrical. The first EESD may have a length between 5 mm and 100 mm. In one embodiment, the first EESD has a length of 37 mm and a diameter of 10 mm.

The electrical heater is also advantageously of low volume. The electrical heater is configured to heat the first EESD efficiently so as to minimise power requirements for the electrical heater. The electrical heater may be positioned in direct contact with the first EESD and may heat the first EESD by conduction. The electrical heater may comprise a heating foil or a heating coil that is wrapped around the first EESD. The electrical heater may comprise an electrically resistive heater that generates heat by Joule heating when a current passes through it. The electrical heater may comprise a flexible substrate that is stable at high temperature. For example the electrical heater may comprise a polyimide substrate. The electrical heater may comprise one or more resistive heating tracks on the substrate. The resistive heating tracks may be formed from copper. The heater may have a thickness of between 0.05 mm and 0.3 mm and may have a length and width to completely cover the first EESD.

The EESD temperature control system may be connected to, or integral with, a power controller configured to control a supply of electrical power from the first EESD to the aerosol-generating element. The power controller may be configured to prevent the supply of power from the first EESD to the aerosol-generating element dependent on an output from the at least one temperature sensor. In this way, the device may be prevented from operating unless the EESD is at a temperature at which it is able to provide satisfactory performance.

The EESD temperature control system may comprise a microcontroller. The microcontroller may be a low temperature microcontroller. Microcontrollers are available with different ranges of operating temperature. The microcontroller is preferably an industrial grade or military grade microcontroller configured to operate at temperatures below 0 degrees Celsius. The microcontroller may be a programmable microprocessor. The power controller may comprise a microcontroller which may be a programmable microprocessor. The EESD temperature control system and the power controller may be implemented using a single microcontroller. The EESD temperature control system may be configured to monitor an electrical resistance of the electrical heater and may control power supplied to the electrical heater based on the electrical resistance.

The EESD temperature control system may include a PID regulator for controlling the power supplied to the electrical heater. The controller may be configured to supply power to the heater as pulses of electrical power. The controller may be configured to alter the supply of power to the electrical heater by altering the duty cycle of the pulses of power.

The first EESD may have electrical terminals and the EESD temperature control system may be connected to the EESD terminals so that the electrical heater can be powered by the first EESD. Even at low temperatures, the first EESD may be able to deliver enough power to operate the electrical heater. Alternatively, or in addition, the electrical heater may be powered by an auxiliary EESD within the device or a EESD that is external to the device.

The aerosol-generating device may be a handheld smoking system.

The aerosol-generating device may be configured to generate an aerosol from an aerosol-forming substrate. The aerosol-forming substrate may be received in the device. An aerosol-forming substrate is a substrate capable of releasing volatile compounds that can form an aerosol. The volatile compounds may be released by heating or combusting the aerosol-forming substrate. As an alternative to heating or combustion, in some cases volatile compounds may be released by a chemical reaction or by a mechanical stimulus, such as vibration. The aerosol-forming substrate may be adsorbed, coated, impregnated or otherwise loaded onto a carrier or support.

The aerosol-generating device may further comprise thermal insulation surrounding the first EESD. Examples of suitable thermal insulation include fibre based fabrics, such as glass wool and ceramic paper, ceramic powder based materials, such as perlite, vermiculite, alumina and silica based ceramics, polymers such as rubber, expanded or extruded polystyrene, polyurethane foam, polyisocyanurate foam, phenolic foam and polyimide foam, and aerogels. The thickness of the thermal insulation depends on the material and whether it is applied as a coating on the first EESD or as a separate layer. Generally the thicker the thermal insulation the better the thermal isolation. Preferably the thermal insulation is at least 1 mm thick.

The thermal insulation may comprise an infra-red reflective layer. The infra-red reflective layer may be an aluminium foil or an aluminised polymer thin film. The film may have a thickness of about 0.02 mm. The infra-red reflective layer may be provided as a coating on the thermal insulation or EESD. The coating may comprise metal, such as aluminium, silver and gold, metal oxides, such as aluminium oxide, titanium dioxide, zinc oxide and cerium dioxide, or metal oxide mixed with dopants, such as fluorine, boron, aluminium, gallium, thallium, copper and iron. The thermal insulation may comprise a phase change material configured to release latent heat to the first EESD when the temperature of the phase change material drops below a threshold.

In one embodiment, the electrical heater may be activated if the output from the at least one temperature sensor indicates that the first EESD has a temperature of less than 10 degrees Celsius. However, any threshold temperature may be chosen depending on the characteristics of the first EESD and the power requirements of the aerosol-generating device. Furthermore, the threshold temperature may be varied dependent on one or more other measured parameters.

The at least one temperature sensor may comprise a first temperature sensor positioned between the first EESD and the thermal insulation and a second temperature sensor positioned outside of the thermal insulation. In other words, the thermal insulation may be positioned between the first temperature sensor and the second temperature sensor. The electrical heater may activated dependent on an output from the first temperature sensor and an output from the second temperature sensor.

The electrical heater may be activated when both the output from the first temperature sensor is below a first threshold and the output from the second temperature sensor is below a second threshold. The first threshold may be equal to the second threshold or may be different to the second threshold. Alternatively, the electrical heater may be activated when the output from the first temperature sensor is below a first threshold but may be deactivated dependent on a change in output from the second temperature sensor. Alternatively, the electrical heater may be activated when the output from the first temperature sensor is below a first threshold but the the value of the first threshold may be determined based on the output of the second temperature sensor. For example, the electrical heater may always be activated when the output from the first temperature sensor indicates a temperature of less than 10 degrees Celsius, but the output of the second temperature sensor may determine that the electrical heater should be activated when the output from the first temperature sensor indicates a temperature of less than a threshold higher than 10 degrees Celsius. If the ambient temperature is higher than 10 degrees Celsius, the EESD may be heated until the output of the first temperature sensor is 10 degrees Celsius. If the ambient temperature is lower than 10 degrees Celsius, say −5 degrees Celsius, the EESD may be heated until the output of the first temperature sensor indicates a higher temperature, say 25 Degrees Celsius, to ensure that the first EESD remains fully functional despite continuing heat loss to the environment. Alternatively, the amount of power supplied to the electrical heater, and hence heating rate, may be dependent on the output from the second temperature sensor.

An advantage of having a temperature sensor outside the thermal insulation in addition to a temperature sensor inside the thermal insulation is that the EESD temperature control system can react more quickly to changes in ambient temperature based on the output of the second temperature sensor and so reduce the risk of overheating the first EESD.

The at least one temperature sensor may comprise one or more of: a resistance temperature detector (RTD), a thermistor, a silicon based integrated circuit (IC) temperature sensor and a thermocouple.

The aerosol-generating element may be an electric heater configured to heat an aerosol-forming substrate to produce an aerosol. The aerosol-generating element may comprise one or more heating elements. The one or more heating elements may comprise one or more resistive heating elements. The one or more heating elements may comprise one or more inductive heating elements. The one or more heating elements may comprise one or more resistive heating elements and one or more inductive heating elements. The one or more electric heating elements may have a temperature range in normal operation of between about 250 degrees Celsius and about 450 degrees Celsius.

The one or more electric heating elements may comprise an electrically resistive material. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. The one or more electric heating elements may comprise an infra-red heating element, a photonic source, or an inductive heating element.

The one or more electric heating elements may take any suitable form. For example, the one or more electric heating elements may take the form of a heating blade. The one or more electric heating elements may take the form of a casing or substrate having different electro-conductive portions, or an electrically resistive metallic tube. One or more heating needles or rods that run through the centre of the aerosol-forming substrate may be used. The one or more electric heating elements may be a disk (end) heating element or a combination of a disk heating element with heating needles or rods. The one or more electric heating elements may comprise a flexible sheet of material arranged to surround or partially surround the aerosol-forming substrate. Other possibilities include a heating wire or filament, for example a Ni—Cr, platinum, tungsten or alloy wire, or a heating plate. Optionally, the one or more heating elements may be deposited in or on a rigid carrier material.

The one or more electric heating elements may comprise a heat sink, or heat reservoir comprising a material capable of absorbing and storing heat and subsequently releasing the heat over time. The heat sink may be formed of any suitable material, such as a suitable metal or ceramic material. Preferably, the material has a high heat capacity (sensible heat storage material), or is a material capable of absorbing and subsequently releasing heat via a reversible process, such as a high temperature phase change. Suitable heat storage materials include silica gel, alumina, carbon, glass mat, glass fibre, minerals, a metal or alloy such as aluminium, silver or lead, and a cellulose material such as paper. Other materials which release heat via a reversible phase change include paraffin, sodium acetate, naphthalene, wax, polyethylene oxide, a metal, metal salt, a mixture of eutectic salts or an alloy.

The one or more heating elements may comprise an inductive heating element, such that, where the device forms part of an aerosol-generating system consisting of the aerosol generating device and a removable aerosol-generating article, no electrical contacts are formed between the article and the device. The device may comprise an inductor coil and a power supply configured to provide high frequency oscillating current to the inductor coil. The article may comprise a susceptor element positioned to heat the aerosol-forming substrate. As used herein, a high frequency oscillating current means an oscillating current having a frequency of between 500 kHz and 10 MHz.

Preferably, the aerosol-generating device is portable. The aerosol-generating device may have a size comparable to a conventional cigar or cigarette. The aerosol-generating device may have a total length between approximately 30 mm and approximately 150 mm. The aerosol-generating device may have an external diameter between approximately 5 mm and approximately 30 mm.

The aerosol-generating device may comprise a housing. The housing may be elongate. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. Preferably, the material is light and non-brittle.

The housing may comprise a mouthpiece. The mouthpiece may comprise at least one air inlet and at least one air outlet. The mouthpiece may comprise more than one air inlet. One or more of the air inlets may reduce the temperature of the aerosol before it is delivered to a user and may reduce the concentration of the aerosol before it is delivered to a user. As used herein, the term "mouthpiece" refers to a portion of an aerosol-generating device that is placed into a user's mouth in order to directly inhale an aerosol generated by the aerosol-generating device from an aerosol-generating article received in the cavity of the housing.

The aerosol-generating device may include a user interface to activate the system, for example a button to initiate heating of the device or display to indicate a state of the device or the aerosol-forming substrate.

The device may comprise one or more indicators. At least one indicator may be configured to indicate when an output of the at least one temperature sensor exceeds an operating threshold or is less than an operating threshold. The one or more indicators may be visual indicator and may include light emitting diodes (LEDs).

The aerosol-forming substrate may be provided in an aerosol-generating article. An aerosol-generating article is an article comprising an aerosol-forming substrate that is capable of releasing volatile compounds that can form an aerosol. The aerosol-generating article may be a non-combustible aerosol-generating article or may be a combustible aerosol-generating article.

The aerosol-generating article may generate an aerosol that is directly inhalable by a user. The aerosol-generating article may be a smoking article that generates an aerosol that is directly inhalable into a user's lungs through the users mouth. The aerosol-generating article may resemble a conventional smoking article, such as a cigarette.

The aerosol-generating article may be substantially cylindrical in shape. The aerosol-generating article may be substantially elongate. The aerosol-generating article may have a length and a circumference substantially perpendicular to the length. The aerosol-forming substrate may be substantially cylindrical in shape. The aerosol-forming substrate may be substantially elongate. The aerosol-forming substrate may also have a length and a circumference substantially perpendicular to the length.

The aerosol-generating article may have a total length between approximately 30 mm and approximately 100 mm. In one embodiment, the aerosol-generating article has a total length of approximately 45 mm. The aerosol-generating article may have an external diameter between approximately 5 mm and approximately 12 mm. In one embodiment, the aerosol-generating article may have an external diameter of approximately 7.2 mm.

The aerosol-forming substrate may have a length of between about 7 mm and about 15 mm. In one embodiment, the aerosol-forming substrate may have a length of approximately 10 mm. Alternatively, the aerosol-forming substrate may have a length of approximately 12 mm.

The aerosol-generating substrate preferably has an external diameter that is approximately equal to the external diameter of the aerosol-generating article. The external diameter of the aerosol-forming substrate may be between approximately 5 mm and approximately 12 mm. In one embodiment, the aerosol-forming substrate may have an external diameter of approximately 7.2 mm.

The aerosol-generating article may comprise a filter plug. The filter plug may be located at a downstream end of the aerosol-generating article. The filter plug may be a cellulose acetate filter plug. The filter plug is approximately 7 mm in length in one embodiment, but may have a length of between approximately 5 mm to approximately 10 mm.

The aerosol-generating article may comprise an outer paper wrapper. Further, the aerosol-generating article may comprise a separation between the aerosol-forming substrate and the filter plug. The separation may be approximately 18 mm, but may be in the range of approximately 5 mm to approximately 25 mm.

The aerosol-forming substrate may be a solid aerosol-forming substrate. Alternatively, the aerosol-forming substrate may comprise both solid and liquid components. The aerosol-forming substrate may comprise a tobacco-containing material containing volatile tobacco flavour compounds which are released from the substrate upon heating. Alternatively, the aerosol-forming substrate may comprise a non-tobacco material. The aerosol-forming substrate may further comprise an aerosol former that facilitates the formation of a dense and stable aerosol. Examples of suitable aerosol formers are glycerine and propylene glycol.

The aerosol-generating system may comprise:
an aerosol-generating device, and
an accessory, wherein the accessory comprises an accessory EESD and wherein the aerosol-generating device and the accessory can be electrically connected. The system may be configured to allow the accessory EESD to supply power to the electrical heater when the aerosol-generating device and the accessory are electrically connected.

The EESD temperature control system may be at least partially contained in the accessory. For example, an EESD temperature sensor may be positioned in the accessory or some or all of the electrical heater may be positioned in the accessory The accessory may comprise an alternating current source and an induction coil configured to inductively heat the first EESD. The aerosol-generating device may comprise a susceptor. The susceptor may be integral with or part of the first EESD or may be positioned around or proximate to the first EESD. The induction coil and the susceptor may together form the electrical heater.

The accessory may be a portable charger and the accessory EESD may be a charging EESD. The system may be configured to allow charging of a first EESD in the aerosol-generating device from the charging EESD.

The accessory may comprise an accessory EESD temperature control system comprising at least one accessory temperature sensor positioned to sense a temperature of the accessory EESD, and a second electrical heater configured to heat the accessory EESD, wherein the accessory EESD temperature control system operates the second electrical heater dependent on an output from the at least one accessory temperature sensor.

The accessory may comprise a heater configured to heat a first EESD in the aerosol-generating device based on a signal from a temperature sensor in the aerosol-generating device.

When the accessory is a portable charger, the accessory EESD temperature control system may be connected to, or integral with, a charging power controller configured to control a supply of electrical power from the accessory EESD to the aerosol-generating device. The charging power controller may be configured to prevent the supply of power from the accessory EESD to the aerosol-generating device dependent on an output from the at least one charger temperature sensor.

The accessory EESD may have electrical terminals and the accessory EESD temperature control system may be connected to the accessory EESD terminals so that the second electrical heater can be powered by the accessory EESD.

The accessory EESD may be a lithium ion battery. In one embodiment, the accessory EESD is a lithium cobalt oxide battery. In the case of a portable charger, the accessory EESD preferably has a capacity greater than the first EESD. Advantageously, the accessory EESD has a capacity at least five times greater than the capacity of the first EESD. This means that the accessory EESD can be used to provide several recharges of the first EESD. Furthermore, the larger capacity of the accessory EESD is advantageous for powering the electrical heater for the first EESD.

The aerosol-generating system may further comprise second thermal insulation surrounding the accessory EESD. The second thermal insulation may comprise an infra-red reflective layer.

The at least one accessory temperature sensor may comprise a first accessory temperature sensor positioned between the accessory EESD and the second thermal insulation and a second accessory temperature sensor positioned outside of the second thermal insulation. The second electrical heater may be activated dependent on an output from the first accessory temperature sensor and an output from the second accessory temperature sensor.

The accessory electrical heater may be activated when both the output from the first accessory temperature sensor is below a first threshold and the output from the second accessory temperature sensor is below a second threshold. The first threshold may be equal to the second threshold or may be different to the second threshold. The first threshold may be dependent on the output from the second accessory temperature sensor. Alternatively, the accessory electrical heater may be activated when the output from the first accessory temperature sensor is below a first threshold but may be deactivated dependent on a change in output from the second accessory temperature sensor. Alternatively, the accessory electrical heater may be activated when the output from the first accessory temperature sensor is below a first threshold but the power supplied to the accessory electrical heater may be dependent on the output from the second accessory temperature sensor.

The at least one temperature sensor may comprise one or more of: a resistance temperature detector (RTD), a thermistor, a silicon based integrated circuit (IC) temperature sensor and a thermocouple.

The accessory EESD temperature control system may comprise a microcontroller. The microcontroller may be a low temperature microcontroller. The microcontroller may be a programmable microprocessor. The charging power controller may comprise a microcontroller which may be a programmable microprocessor. The accessory EESD temperature control system and the charging power controller may be implemented using a single microcontroller.

The accessory EESD temperature control system may include a PID regulator for controlling the power supplied to the accessory electrical heater or the electrical heater. The controller may be configured to supply power to the heater as pulses of electrical power. The controller may be configured to alter the supply of power by altering the duty cycle of the pulses of power.

The aerosol-generating device may comprise a switch that is switched to allow power from the accessory EESD to be delivered to the electrical heater when the aerosol-generating device is connected to the accessory.

Data may be communicated between the aerosol-generating device and the accessory, as well as from the accessory to a computer interface capable of being read by a computer or other electronic device capable of transferring data to a computer or the internet. Preferably, the data connection operates under an interface standard. An interface standard is a standard that describes one or more functional characteristics, such as code conversion, line assignments, or protocol compliance, or physical characteristics, such as electrical, mechanical, or optical characteristics, necessary to allow the exchange of information between two or more systems or pieces of equipment. Examples of suitable interface standards for the communications link include, but are not limited to, the Recommended Standard 232 (RS-232) family of standards; USB; Bluetooth; FireWire (a brand name of Apple, Inc for their IEEE 1394 interface), IrDA (Infrared Data Association—a communications standard for the short-range exchange of data by Infrared light); Zigbee (a specification based on the IEEE 802.15.4 standard for wireless personal area networks) and other Wi-Fi standards.

The accessory may further comprise an indicator for indicating to a user. The indicator preferably comprises at least one of: a visual indicator, such as a light, or series of lights; a sound, or series of sounds; and a tactile indicator. The tactile indicator may be a vibration or series of vibrations. The indicator may indicate when the electrical heater is activated. The visual indicator may be an electronic display. In the case of a portable charger, the electronic display may provide an estimate of the time required to fully charge the first EESD.

The accessory or portable charger may include a display, or further display, (for example a digital display) indicating information to the user. For example, the display may indicate smoking article consumption, energy usage or other information. The display may further indicate when the first EESD has sufficient charge to be used to consume a smoking article. The display may indicate when the accessory EESD or first EESD is being heated before use.

Preferably, the portable charger further comprises a housing. The housing may device a cavity into which the aerosol-generating device is received when it is to be charged. The portable charger may be a substantially rectangular parallelepiped comprising two wider walls spaced apart by two narrower side walls and top and bottom walls. The portable charger may be of a similar size and shape to a pack of lit-end cigarettes.

The accessory may be a heating device configured to receive the aerosol-generating device, the heating device comprising an heating device EESD. The aerosol-generating device and the heating device can be electrically connected. The system may be configured to allow the heating device EESD to supply power to the electrical heater when the aerosol-generating device and the heating device are electrically connected.

In the case that the accessory is a portable charger, the system may comprise a second accessory, which may be a heating device configured to receive the portable charger and the aerosol-generating device, the heating device comprising a heating device EESD, wherein the aerosol-generating device or portable charger and the heating device can be electrically connected, and wherein the system is configured to allow the heating device EESD to supply power to the electrical heater when the aerosol-generating device or portable charger and the heating device are electrically connected.

In a third aspect of the invention, there is provided an aerosol-generating system comprising:

an aerosol-generating device in accordance with the first aspect of the invention, and a portable charger, wherein the portable charger comprises a charging electrochemical energy storage device (EESD) and wherein the aerosol-generating device and the portable charger can be electrically connected to allow the first EESD to be charged from the charging EESD, and wherein the portable charger comprises a charging EESD temperature control system comprising at least one charger temperature sensor positioned to sense a temperature of the charging EESD, and a second electrical heater configured to heat the charging EESD, wherein the charging EESD temperature control system operates the second electrical heater dependent on an output from the at least one charger temperature sensor.

In a fourth aspect of the invention, there is provided a method of controlling operation of an electrically operated aerosol-generating device, the electrically operated aerosol-generating device comprising an electrically operated aerosol-generating element; a first electrochemical energy storage device (EESD) configured to supply electrical power to the aerosol-generating element; and a EESD temperature control system comprising at least one temperature sensor positioned to sense a temperature of the first EESD, and an electrical heater configured to heat the first EESD, the method comprising:

monitoring an output of the at least one temperature sensor and operating the electrical heater if the output of the at least one temperature sensor is below a first threshold, and preventing a supply of power from the first EESD to the electrically operated aerosol-generating element until the output of the at least one temperature sensor is equal to or above a second threshold.

The method may comprise operating the electrical heater only when both the output from the first temperature sensor is below a first threshold and the output from the second temperature sensor is below a second threshold. The first threshold may be equal to the second threshold or may be different to the second threshold. The first threshold may be dependent on an output of the second temperature sensor. Alternatively, the method may comprise operating the electrical heater only when the output from the first temperature sensor is below a first threshold but deactivating the electrical heater dependent on a change in output from the second temperature sensor. Alternatively, the method may comprise operating the electrical heater when the output from the first temperature sensor is below a first threshold and adjusting the power supplied to the electrical heater dependent on the output from the second temperature sensor.

In a fifth aspect of the invention there is provided an aerosol-generating system comprising:

an aerosol-generating device, and an accessory, wherein the accessory is configured to receive the aerosol-generating device in use and comprises a heater configured to heat an EESD in the aerosol-generating device based on a sensed temperature. The accessory may comprise an temperature sensor. Alternatively, the accessory may be electrically connected to the aerosol-generating device and may be configured to receive data indicative of a sensed temperature from the aerosol-generating device.

Features described with reference to one aspect of the invention may be applied to other aspects of the invention.

Embodiments of the invention will now be described in detail, by way of example only, with reference to the accompanying drawings, in which:

FIG. 2b is a disassembled view of the heater and insulation assembly of FIG. 2a;

Figure 1:
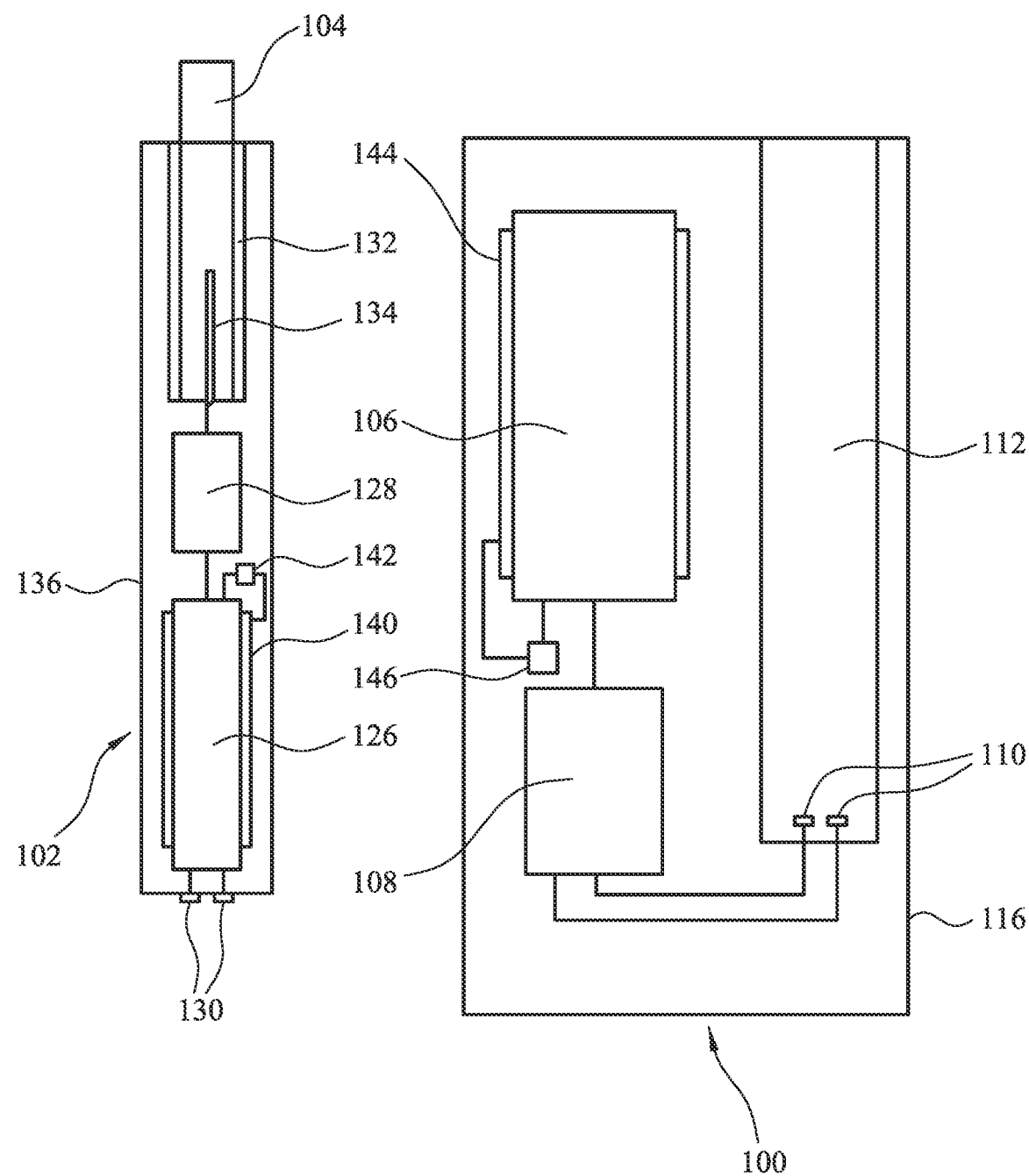
FIG. 1 is a schematic illustration of an aerosol-generating device and a portable charger in accordance with one embodiment of the invention.
Figure 5:
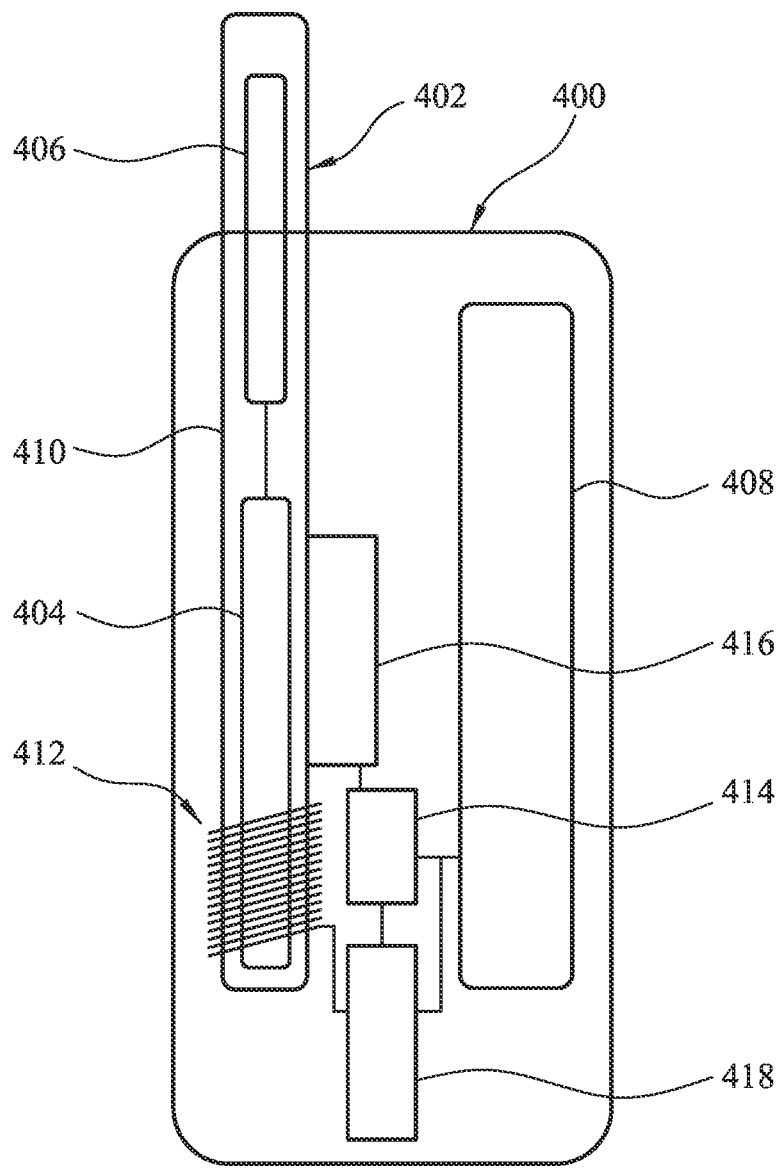
Figure 6:
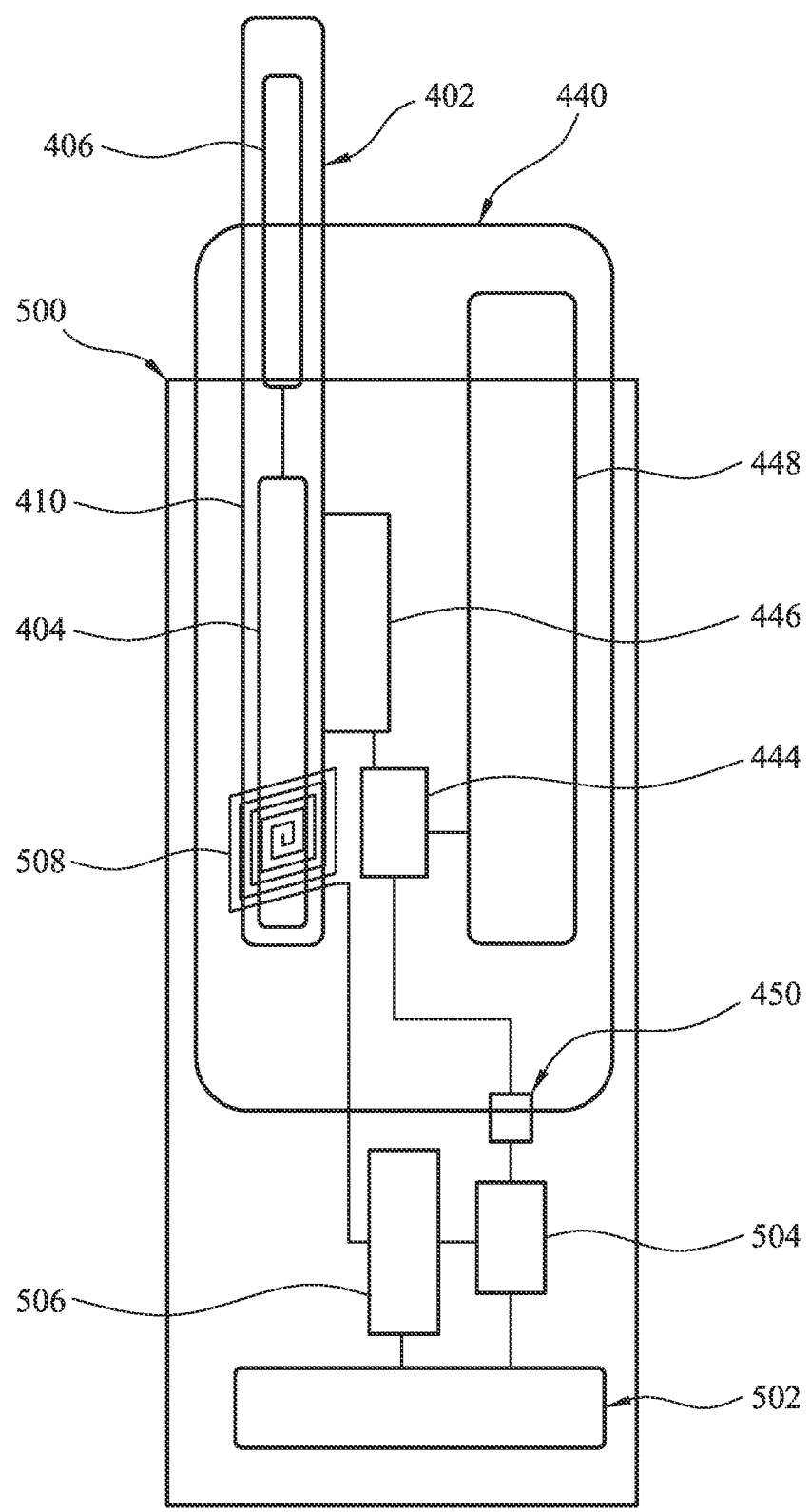

FIG. 5 is a schematic illustration of an embodiment of a EESD temperature control system using an inductive heater using a portable charger; and FIG. 6 is a schematic illustration of an embodiment of a EESD temperature control system using an inductive heater using a dedicated battery warming accessory, FIG. 1 shows a portable charger 100 and an aerosol generating device 102. The aerosol-generating device 102 in this example is an electrically heated aerosol-generating device adapted to receive a smoking article 104 comprising an aerosol-forming substrate. The aerosol-generating device includes a heater 134 to heat the aerosol-forming substrate in operation. The user inhales on a mouthpiece portion of the smoking article 104 to draw aerosol into the user's mouth. The aerosol-generating device 102 is configured to be received within a cavity 112 in the portable charger 100 in order to recharge the power supply in the aerosol-generating device.

The portable charger 100 comprises charging battery 106, charging control electronics 108, and electrical contacts 110 configured to provide electrical power to a first battery in the aerosol-generating device, from the charging battery 106, when the aerosol-generating device is in connection with the electrical contacts 110. The electrical contacts 110 are provided adjacent the bottom of a cavity 112. The cavity is configured to receive the aerosol-generating device 102. The components of the portable charger 100 are housed within the housing 116.

The aerosol-generating device 102 comprises a first battery 126, control electronics 128 and electrical contacts 130. As described above, the first battery 126 of the aerosol-generating device 102 is configured to receive a supply of power from the charging battery 106 when the electrical contacts 130 are in contact with the electrical contacts 110 of the portable charger 100. The aerosol-generating device 102 further comprises a cavity 132 configured to receive the smoking article 104. A heater 134, in the form of, for example, a blade heater, is provided at the bottom of the cavity 132. In use, the user activates the aerosol-generating device 102, and power is provided from the first battery 126 via the control electronics 128 to the heater 134. The heater is heated to a standard operational temperature that is sufficient to generate an aerosol from the aerosol-forming substrate of the aerosol-generating article 104. The components of the aerosol-generating device 102 are housed within the housing 136. An aerosol-generating device of this type is described more fully in EP2110033 for example.

The aerosol-forming substrate preferably comprises a tobacco-containing material containing volatile tobacco flavour compounds which are released from the substrate upon heating. Alternatively, the aerosol-forming substrate may comprise a non-tobacco material. Preferably, the aerosol-forming substrate further comprises an aerosol former. Examples of suitable aerosol formers are glycerine and propylene glycol.

The aerosol-forming substrate may be a solid substrate. The solid substrate may comprise, for example, one or more of: powder, granules, pellets, shreds, spaghettis, strips or sheets containing one or more of: herb leaf, tobacco leaf, fragments of tobacco ribs, reconstituted tobacco, homogenised tobacco, extruded tobacco and expanded tobacco.

In this example, the aerosol-generating device 102 is an electrically heated smoking device. As such the aerosol-generating device 102 is small (conventional cigarette size) but must deliver high power over a period of just a few minutes, typically around 7 minutes for a single smoking session. The second battery may then need to be returned to the portable charger 100 for recharging. Recharging is desirably completed, at least to a level sufficient to allow for another complete smoking experience, in a matter of a few minutes and preferably less than 6 minutes.

The charging battery 106 in the portable charger is configured to hold sufficient charge to recharge the second battery 126 several times before needing recharging itself. This provides the user with a portable system that allows for several smoking sessions before recharging from a mains outlet is required.

It is also desirable that the charging battery need not be frequently replaced. Preferably the second battery has a useful life of at least one year, equating to around 8000 charge/discharge cycles for a typical user.

In order to satisfy the competing requirements for the second battery 126 of small size, sufficient capacity and safe, but fast, charge and discharge, as well as acceptable lifetime, a lithium iron phosphate (LiFePO4) battery chemistry may be used, as in this example. The first battery 126 in this example has a cylindrical shape, with a diameter of 10 mm and a length of 37 mm. This battery is able to undergo 8000 cycles of charge/discharge at more than 900 J per cycle. The average charging rate may be up to 12 C. A charging rate of 1 C means that the battery is fully charged from zero charge to full charge in one hour and a charging rate of 2 C means that the battery is fully charged from zero charge to full charge in half an hour. The battery capacity is in the region of 125 mAh. The maximum charging current can range from 980 mA to 1.5 A. Discharging is performed using 1 millisecond pulses of up to 4 A. At typical operating temperature the discharging rate is around 13 C. As an alternative, a lithium titanate battery may be used for the second battery.

The charging battery 106 in the portable charger 100 is a lithium cobalt oxide (LiCoO2) battery of the prismatic type. The charging battery has a capacity of around 2900 mAh, over ten times the capacity of the first battery. The first battery may be charged from the charging battery at a rate between 2 C and 16 C. Discharging the charging battery at a rate of 1 C provides a charging rate of over 10 C to the first battery. Charging of the charging battery can be performed from a mains supply, at a rate between 0 and 1.5 C, and typically at a rate of around 0.5 C to maximise battery life.

A lithium cobalt oxide battery provides a higher battery voltage than lithium iron phosphate, allowing the charging of a lithium iron phosphate battery from a single lithium cobalt oxide battery.

Both the first battery 126 and the charging battery 106 have an associated battery heater assembly. Electrical heater 140 surrounds the first battery 126 and is controlled by low-temperature microcontroller 142. Charging battery heater 144 surrounds charging battery 106 and is controlled by a second low-temperature microcontroller 146.

Figure 2A:
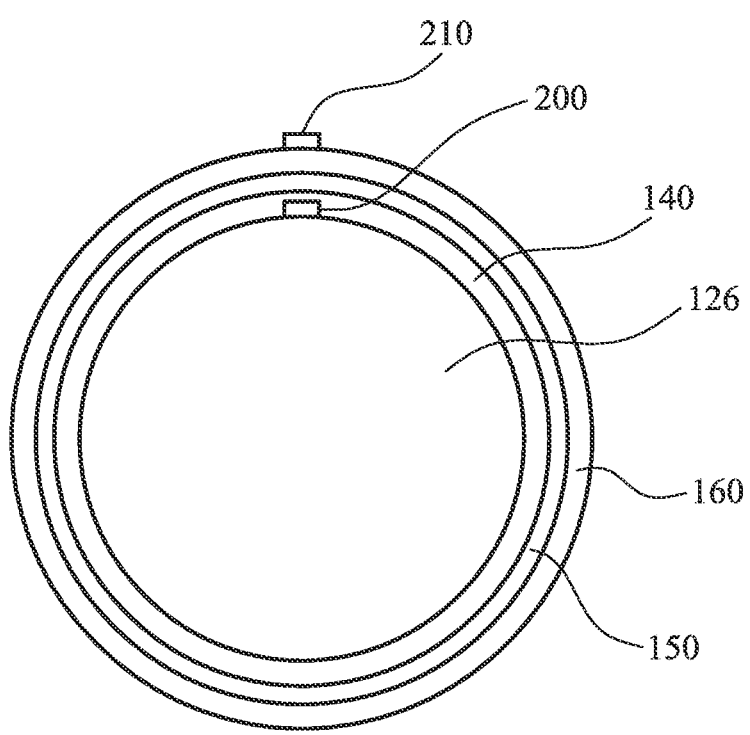
FIG. 2a is a schematic cross section of a battery with a battery heater and insulation assembly.
Figure 2B:
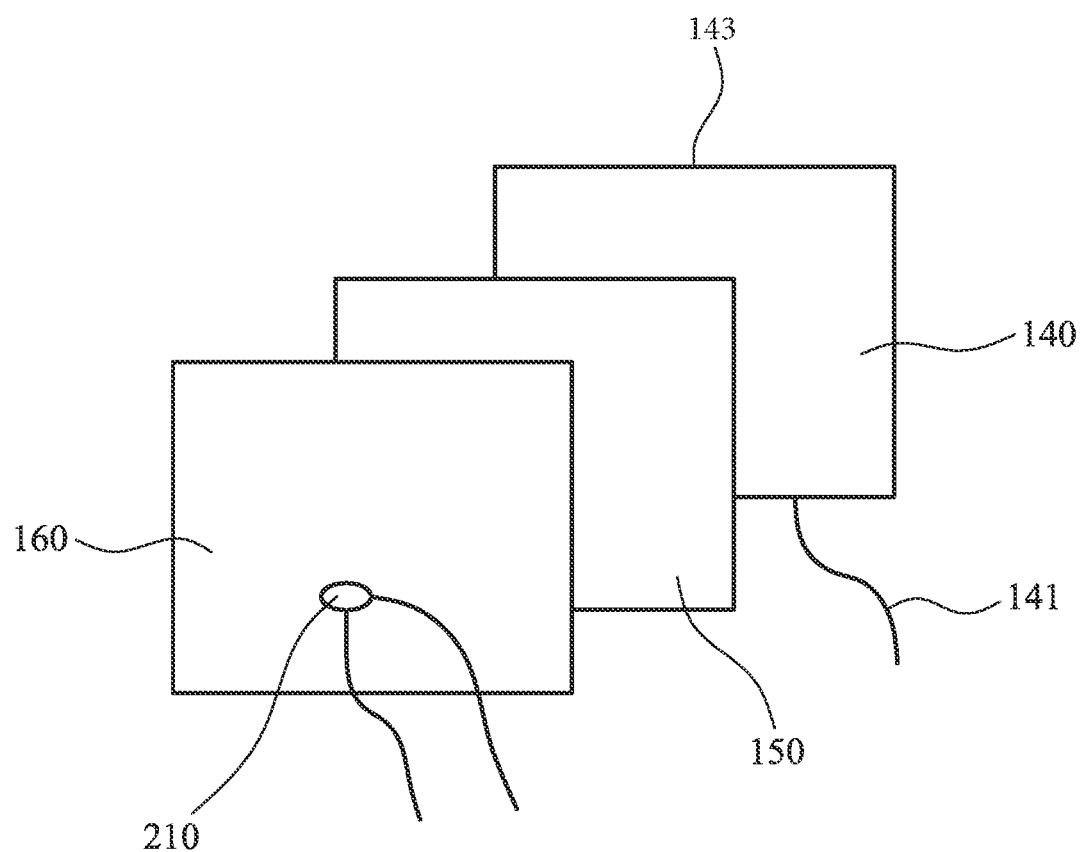

FIG. 2a is a schematic cross-section of a battery heater assembly surrounding the first battery 126 shown in FIG. 1. FIG. 2b is a disassembled view of the heater and insulation layers in the battery heater assembly of FIG. 2a. The battery heater assembly comprises a first battery heater 140 that is a foil wrapped around the battery 126. As shown in FIG. 2b, electrical connections 141, 143 provide electrical current to the foil heater 140. The supply of power to the heater 140 will be described in greater detail below. Surrounding the foil heater 140 is an infrared reflective layer, which may be provided as a foil or coating. An insulating layer 160 is provided around the reflective layer. The heater 140, reflective layer 150 and insulating layer 160, may be provided as a co-laminated structure. The reflective layer reduces radiative heat losses from the battery. The insulating layer reduces conductive heat losses from the battery.

In addition, the battery heater assembly includes two temperature sensors. A first temperature sensor 200 is provided between the battery 126 and the battery heater 140. A second temperature sensor 210 is provided outside the insulating layer 160. The output from the two temperature sensors is used in the control of the power supplied to the battery heater 140 by the microcontroller 142.

In this example, the insulating layer 160 is formed from glass wool and has a thickness of 3 mm. The reflective layer 150 is an aluminium foil having a thickness of 0.02 mm. The foil heater 140 comprises a substrate of polyimide onto which resistive copper layer is laminated. The temperature sensors 200, 210 are thermistors.

FIGS. 2a and 2b illustrate the battery heater assembly for the first battery 126. An identical battery heater assembly is provided for the charging battery 106.

Figure 3:
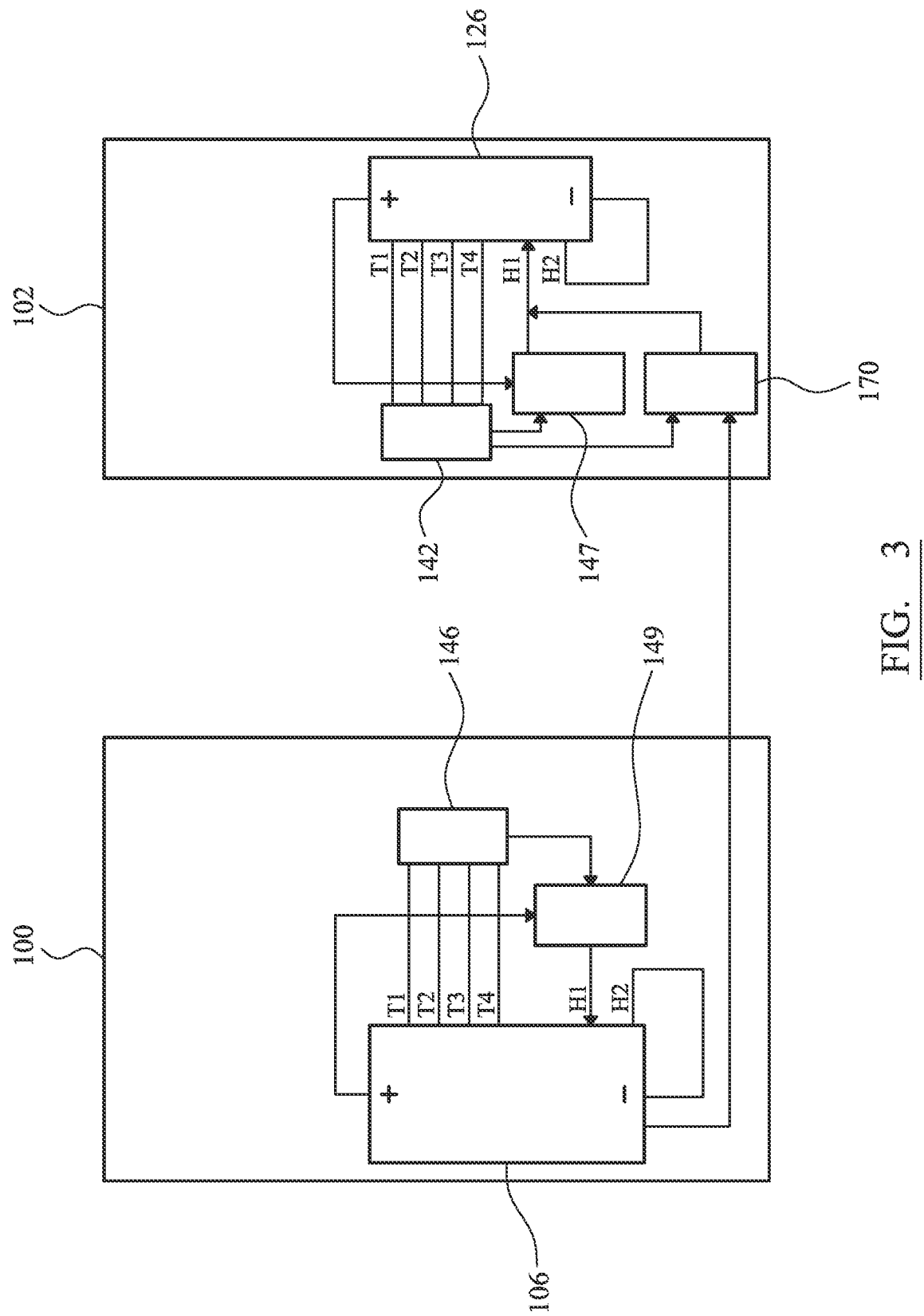
FIG. 3 is a schematic view of the control elements of a EESD temperature control system in accordance with the invention.

FIG. 3 the control elements of a EESD temperature control system in a system as illustrated in FIG. 1. The aerosol-generating device 102 comprises first battery 126, surrounded by the battery heater assembly described with reference to FIG. 2a but not shown in FIG. 3 for clarity. The microcontroller 142 is an industrial grade microcontroller that operates at temperatures down to −40 degrees Celsius. The microcontroller 142 is connected to the first temperature sensor 200 through connections T1 and T2 and is connected to the second temperature sensor through connections T3 and T4. Power is provided to the heater assembly from the first battery 126 through connections H1 and H2. The microcontroller 142 controls the supply of current to the heater assembly through connection H2 by controlling switch 147. Based on the output of the temperature sensors 200 and 210, the microcontroller closes or opens switch 147. The amount of power provided to the heater assembly, and hence the temperature of the first battery 126 is controlled by varying the duty cycle of the operation of the switch 147. Using feedback from the temperature sensors 200 and 210, the temperature of the battery can be maintained at or above a desired temperature. In this example, the desired temperature is 10 degrees Celsius and a control process is described in more detail below, with reference to FIG. 6.

A EESD temperature control system is also provided for the portable charger 100, which operates in an identical manner. The charging battery 106 is provided with a similar battery heater assembly, as described with reference to FIGS. 2a and 2b. The microcontroller 146 is also an industrial grade microcontroller that operates at temperatures down to −40 degrees Celsius. The microcontroller 146 is connected to a first temperature sensor 200 through connections T1 and T2 and is connected to a second temperature sensor through connections T3 and T4. Power is provided to the heater assembly from the charging battery 106 through connections H1 and H2. The microcontroller 146 controls the supply of current to the heater assembly through connection H2 by controlling switch 149. Based on the output of the temperature sensors, the microcontroller closes or opens switch 149. The amount of power provided to the heater assembly, and hence the temperature of the charging battery 106 is controlled by varying the duty cycle of the operation of the switch 149. Using feedback from the temperature sensors 200 and 210, the temperature of the charging battery can be maintained at or above a desired temperature.

When the aerosol-generating device is connected to the portable charger, it is possible to provide power to the battery heater for the first battery from the portable charger. A second switch 170 is provided which allows for selective connection of the charging battery to the battery heater for the first battery. The microcontroller 142 controls the supply of current to the heater assembly through connection H2 by controlling both switch 147 and switch 170. If the aerosol-generating device is connected to the portable charger the microcontroller 142 may disconnect the first battery 126 from the first battery heater but may allow connection of the charging battery to the first battery heater. The charging battery may be at a higher temperature than the first battery and so may be able to deliver more power. The charging battery also typically has greater capacity than the first battery.

Figure 4:
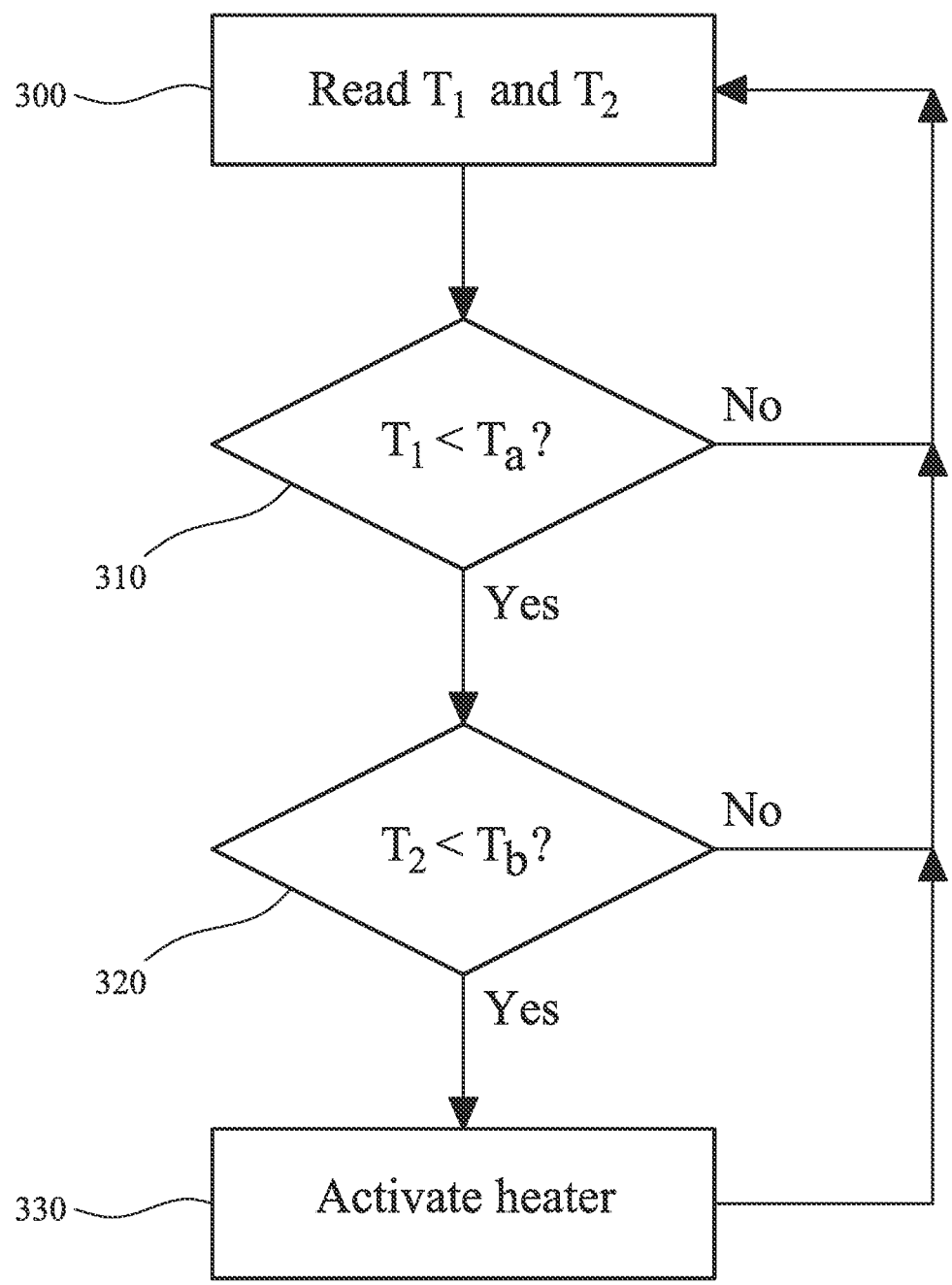
FIG. 4 is a flow diagram illustrating an example of a control process used in a EESD temperature control system, in accordance with the invention.

FIG. 4 illustrates a basic control method using two temperature sensors. In a first step The output from the first temperature sensor, referred to as $T_1$, and the output from the second temperature sensor 210, referred to as $T_2$, are read by the microcontroller. In step 310, the value of $T_1$ is compared to a first threshold value, $T_a$, in this case 10 degrees Celsius. If $T_1$ is not less than $T_a$ then the process return to step 300 for another cycle. If $T_1$ is less than $T_a$ then the process proceeds to step 320. In step 320 the value of $T_2$ is compared to a first threshold value, $T_b$, in this case 12 degrees Celsius. If $T_2$ is not less than $T_b$ then the process return to step 300 for another cycle. If $T_2$ is less than $T_b$ then the process proceeds to step 330 in which the battery heater is activated by providing a current pulse to the battery heater. The process is then repeated by returning to step 300. The advantage of having a second temperature sensor sensing ambient temperature is that thermal overshoot can be more easily avoided. Normal operation of the device will generate some heat. If the ambient temperature is above a threshold level, then active heating of the battery may be not be necessary even if the battery temperature is initially below the first threshold. For example, if the device is taken from a cold environment to a warm, indoor environment just prior to use, the battery temperature may be below the optimal temperature but passive heating of the battery may be sufficient. Active heating of the battery may both be a waste of energy and lead to possible thermal overshoot.

FIG. 5 illustrates an alternative configuration of a EESD temperature control system for an aerosol-generating device and a portable charger. The embodiment of FIG. 4 uses inductive heating to heat the first battery within the aerosol-generating device using a coil held within the charger.

The aerosol-generating device 402 is illustrated schematically and comprises a first battery 404 and an aerosol-generating element 406. The portable charger 400 comprises a charging battery 408. The aerosol-generating device 402 is held in a cavity 410 in the portable charger. A coil 412 in the portable charger surrounds a portion of the cavity 412 so that it surrounds a portion of the first battery 404 when the aerosol-generating device 402 is held in the cavity 410. The aerosol-generating device has a susceptor element (not shown) which is integral or close to the first battery. The coil 412 is connected to a high frequency AC source 418, which is powered by the charging battery 408. The portable charger also comprises a thermistor 416 adjacent to the cavity 410 to sense the temperature of the first battery or the housing of the aerosol-generating device. A microcontroller 414 is connected to the thermistor 416, the charging battery 408 and the high frequency AC source 418. Based on the output of the thermistor 416, the microcontroller 414 allows the supply of high frequency alternating current to the coil 412. When the temperature sensed by the temperature sensor falls below 10 degrees Celcius the AC source is switched on by the microcontroller. When a high frequency alternating current is supplied to the coil it causes inductive heating of the susceptor and so heats the first battery. Using feedback from the thermistor 416, the temperature of the battery can be maintained at or above a desired temperature.

The portable charger may continually monitor the temperature sensed by the temperature sensor and operate the coil to prevent the temperature ever falling below 10 degrees Celsius. The same process may be carried out for the charging battery. Alternatively, the charging battery may be configured to operate at low temperatures and the battery heating system only activated following a user input.

As an alternative to inductive heating, the coil 412 could be configured to act as a resistive heater that heats the cavity 410, and so heats the first battery 404 when it is in the cavity. A DC current could be applied to the coil 412, or another form of resistive heater, to heat the cavity by Joule heating.

FIG. 6 illustrates a further alternative configuration in which a dedicated warming accessory is provided separate to the portable charger. The warming accessory 500 is a pouch that receives both the portable charger and the aerosol-generating device together and operates to heat the battery in the aerosol-generating device inductively.

The aerosol-generating device 402 in FIG. 6 is identical to the aerosol-generating device shown in FIG. 5 and comprises a first battery 404 and an aerosol-generating element 406. The aerosol-generating device has a susceptor element (not shown) which is integral or close to the first battery. The portable charger 440 comprises a charging battery 448. The aerosol-generating device 402 is held in a cavity 410 in the portable charger. The portable charger also comprises a temperature sensor 446 adjacent to the cavity 410 to sense the temperature of the first battery or the housing of the aerosol-generating device. A microcontroller 444 is connected to the temperature sensor 416, the charging battery 448 and to an interface 450 with the warming accessory 500.

The warming accessory 500 comprises an accessory EESD 502, a microcontroller 504, a high frequency AC source 506 and a coil 508. The coil is positioned within the warming accessory at a position adjacent the first battery when the aerosol-generating device is received in the warming accessory. In the example shown, the coil 508 is a planar coil. The microcontroller 504 is connected to the accessory EESD 502 and to the high frequency AC source 506. The microcontroller 504 is also connected to the interface 450 and receives signals through the interface 450 based on the output from the temperature sensor 446 in the portable charger. The interface allows for data exchange between the warming accessory and the portable charger and may be a micro USB connection for example. As an alternative to the interface 450, the warming accessory may exchange information with the portable charger through a wireless connection, such as Bluetooth. When the temperature sensed by temperature sensor 446 falls below a threshold temperature, for example 10 degrees Celsius, the microcontroller switched the AC source on. When a high frequency alternating current is supplied to the coil it causes inductive heating of the susceptor and so heats the first battery. Using feedback from the temperature sensor 446, the temperature of the battery can be maintained at or above a desired temperature.

The same arrangement can be provided to heat the charging battery in the portable charger.

The warming accessory may comprise thermal insulation that reduce heat loss both from the accessory EESD 502 but that also from the portable charger and the aerosol-generating device.

Again, as an alternative to inductive heating, the warming accessory could comprise a resistive heater configured to heat the interior of the accessory and any charger and aerosol-generating device received in the accessory. The resistive heater could be controlled based on feedback from the temperature sensor 446, in the manner described with reference to FIG. 6.

Systems in accordance with the invention result in an improved and more consistent user experience compared to systems without battery temperature regulation. Although battery warming may reduce the energy available for aerosol-generation or battery charging, the advantage of providing a satisfying delivery of aerosol to the user regardless of the ambient conditions is more critical.

Although embodiments of the invention have been described with reference to one particular type of aerosol-generating device, it should be clear that the invention can be applied to any type of battery powered portable aerosol-generating device.

The invention claimed is:

1. An aerosol-generating system, comprising:
   an electrically operated aerosol-generating element;
   a first electrochemical energy storage device (EESD) configured to supply electrical power to the aerosol-generating element;
   an EESD temperature control system comprising at least one temperature sensor positioned to sense a temperature of the first EESD and an electrical heater configured to heat the first EESD, wherein the EESD temperature control system operates the electrical heater dependent on an output from the at least one temperature sensor; and
   thermal insulation surrounding the first EESD,
   wherein the at least one temperature sensor comprises a first temperature sensor positioned between the first EESD and the thermal insulation and a second temperature sensor positioned outside of the thermal insulation, and
   wherein the electrical heater is activated dependent on an output from the first temperature sensor and an output from the second temperature sensor.

2. The aerosol-generating system according to claim 1, further comprising a handheld aerosol-generating device, wherein the handheld aerosol-generating device comprises the aerosol-generating element, the first EESD, and the EESD temperature control system.

3. The aerosol-generating system according to claim 2, wherein the EESD temperature control system is connected to, or integral with, a power controller configured to control a supply of electrical power from the first EESD to the aerosol-generating element, and wherein the power controller is configured to prevent the supply of power from the first EESD to the aerosol-generating element dependent on an output from the at least one temperature sensor.

4. The aerosol-generating system according to claim 1, wherein the first EESD has electrical terminals, and wherein the EESD temperature control system is connected to the first EESD terminals so that the electrical heater can be powered by the first EESD.

5. The aerosol-generating system according to claim 1, further comprising:
   an aerosol-generating device; and
   an accessory comprising an accessory EESD,
   wherein the aerosol-generating device and the accessory are configured to be electrically connected, and
   wherein the aerosol-generating system is configured to allow the accessory EESD to supply power to the electrical heater when the aerosol-generating device and the accessory are electrically connected.

6. The aerosol-generating system according to claim 5, wherein the EESD temperature control system is at least partially contained in the accessory.

7. The aerosol-generating system according to claim 6, wherein the accessory further comprises an alternating current source and an induction coil configured to inductively heat the first EESD.

8. The aerosol-generating system according to claim 5, wherein the accessory is a portable heating device.

9. The aerosol-generating system according to claim 5, wherein the accessory is a portable charger, and
wherein the aerosol-generating system is further configured to allow charging of the first EESD from the accessory EESD.

10. The aerosol-generating system according to claim 9, further comprising a heating device configured to receive the portable charger and the aerosol-generating device, the heating device comprising a heating device EESD,
wherein the aerosol-generating device or portable charger and the heating device are configured to be electrically connected, and
wherein the aerosol-generating system is further configured to allow the heating device EESD to supply power to the electrical heater when the aerosol-generating device or portable charger and the heating device are electrically connected.

11. The aerosol-generating system according to claim 5, wherein the accessory further comprises an accessory EESD temperature control system comprising at least one accessory temperature sensor positioned to sense a temperature of the accessory EESD, and a second electrical heater configured to heat the accessory EESD,
wherein the accessory EESD temperature control system operates the second electrical heater dependent on an output from the at least one accessory temperature sensor.

12. The aerosol-generating system according to claim 11, wherein the accessory is a portable charger,
wherein the aerosol-generating system is further configured to allow charging of the first EESD from the accessory EESD,
wherein the accessory EESD temperature control system is connected to, or integral with, a power controller configured to control a supply of electrical power from the accessory EESD to the aerosol-generating device, and
wherein the power controller is further configured to prevent the supply of power from the accessory EESD to the aerosol-generating device dependent on an output from the at least one accessory temperature sensor.

13. The aerosol-generating system according to claim 11, wherein the accessory EESD has electrical terminals, and
wherein the accessory EESD temperature control system is connected to the accessory EESD terminals so that the second electrical heater can be powered by the accessory EESD.

14. The aerosol-generating system according to claim 1, wherein the thermal insulation comprises an infrared reflective layer.

15. The aerosol-generating system according to claim 1, further comprising:
a handheld aerosol-generating device, wherein the handheld aerosol-generating device comprises the aerosol-generating element, the first EESD, and the EESD temperature control system; and
a portable charger, wherein the portable charger comprises a charging EESD and a charging EESD temperature control system,
wherein the handheld aerosol-generating device and the portable charger are configured to be electrically connected to allow the first EESD to be charged from the charging EESD, and
wherein the charging EESD temperature control system comprises at least one charger temperature sensor positioned to sense a temperature of the charging EESD, and a second electrical heater configured to heat the charging EESD, and
wherein the charging EESD temperature control system operates the second electrical heater dependent on an output from the at least one charger temperature sensor.

16. A method of controlling operation of an electrically operated aerosol-generating device comprising an electrically operated aerosol-generating element; a first electrochemical energy storage device (EESD) configured to supply electrical power to the aerosol-generating element; an EESD temperature control system comprising at least one temperature sensor positioned to sense a temperature of the first EESD and an electrical heater configured to heat the first EESD, and thermal insulation surrounding the first EESD, wherein the at least one temperature sensor comprises a first temperature sensor positioned between the first EESD and the thermal insulation and a second temperature sensor positioned outside of the thermal insulation, and wherein the electrical heater is activated dependent on an output from the first temperature sensor and an output from the second temperature sensor, the method comprising:
monitoring an output of the at least one temperature sensor and operating the electrical heater if the output of the at least one temperature sensor is below a first threshold, and preventing a supply of power from the first EESD to the electrically operated aerosol-generating element until the output of the at least one temperature sensor is equal to or above a second threshold.

* * * * *